United States Patent
Wang (10) Patent No.: US 9,668,244 B2
(45) Date of Patent: May 30, 2017

(54) RADIO RESOURCE MANAGEMENT METHOD, MACRO BASE STATION, AND LOW-POWER NODE

(71) Applicant: ZTE CORPORATION, Shenzhen, Guangdong Province (CN)

(72) Inventor: Xin Wang, Shenzhen (CN)

(73) Assignee: ZTE CORPORATION (CN)

(*) Notice: Subject to any disclaimer, the term of this patent is extended or adjusted under 35 U.S.C. 154(b) by 0 days.

(21) Appl. No.: 14/782,074

(22) PCT Filed: Jan. 20, 2014

(86) PCT No.: PCT/CN2014/070883
§ 371 (c)(1),
(2) Date: Oct. 2, 2015

(87) PCT Pub. No.: WO2014/169718
PCT Pub. Date: Oct. 23, 2014

(65) Prior Publication Data
US 2016/0050646 A1    Feb. 18, 2016

(30) Foreign Application Priority Data
Apr. 16, 2013    (CN) .......................... 2013 1 0130961

(51) Int. Cl.
H04W 72/04    (2009.01)
H04W 28/16    (2009.01)
H04W 16/32    (2009.01)

(52) U.S. Cl.
CPC .......... *H04W 72/04* (2013.01); *H04W 28/16* (2013.01); *H04W 16/32* (2013.01)

(58) Field of Classification Search
None
See application file for complete search history.

(56) References Cited

U.S. PATENT DOCUMENTS

2015/0358945 A1* 12/2015 Susitaival ............. H04W 48/16
370/329
2016/0021592 A1* 1/2016 Vesely ............. H04W 36/0072
370/331
(Continued)

FOREIGN PATENT DOCUMENTS

CN    101938783 A    1/2011
CN    102264131 A    11/2011
(Continued)

OTHER PUBLICATIONS

Catt: "RRM Related Issues of Dual Connectivity Technique", Apr. 15-19, 2013, 3GPP TSG RAN WG2 Meeting #81bis, Chicago, USA, R2-130978.

(Continued)

*Primary Examiner* — Diane Mizrahi
(74) *Attorney, Agent, or Firm* — Plumsea Law Group, LLC (57) ABSTRACT

Disclosed are a method for radio resource management, a macro eNB and a low power node. The method is applied to a long term evolution (LTE) system introduced with a low power node, including: a macro eNB selecting a low power node for an accessed user equipment to provide a joint transmission service; the low power node and the macro eNB jointly providing a radio resource management service for the user equipment. The macro eNB includes a selection unit and a first resource management unit. The low power node includes a second resource management unit and a data transmission unit.

20 Claims, 5 Drawing Sheets

(56) References Cited

U.S. PATENT DOCUMENTS

2016/0028585 A1* 1/2016 Wager ................... H04B 7/024
455/452.2
2016/0050552 A1* 2/2016 Kim ..................... H04W 8/005
455/434

FOREIGN PATENT DOCUMENTS

EP          2866498 A1    4/2015
WO       2012027899 A1    8/2012

OTHER PUBLICATIONS

Huawei et al: "Study of Solutions and Radio Protocol Architecture for Dual-Connectivity", Apr. 15-19, 2013, 3GPP TSG-RAN WG2 Meeting #81bis, Chicago, USA, R2-131164.
NTT Docomo et al: "Necessity of C-plane Architecture Enhancements for Dual Connectivity", Apr. 15-19, 2013, 3GPP TSG-RAN2 #81bis, Chicago, USA, R2-131329.
ZTE Corporation: "Mobility Enhancment for Small Cell", Jan. 28 to Feb. 1, 2013, 3GPP TSG-RAN2 Meeting #81, St. Julian's, Malta, R2-130135.
Alcatel: "Location of RRC Function and its Impact on Complexity", Jan. 10-12, 2006, 3GPP TSG-RAN WG 3 Meeting #50, Sophia-Antipolis, France, R3-060055.
European Search Report issued Mar. 7, 2016 in European Patent Application No. EP 14784982.2.

* cited by examiner

RADIO RESOURCE MANAGEMENT METHOD, MACRO BASE STATION, AND LOW-POWER NODE

CROSS-REFERENCE TO RELATED APPLICATION(S)

This application is the U.S. National Phase application of PCT application number PCT/CN2014/070883 having a PCT filing date of Jan. 20, 2014, which claims priority of Chinese patent application 201310130961.X filed on Apr. 16, 2013, the disclosures of which are hereby incorporated by reference.

TECHNICAL FIELD

The present document relates to the long-term evolution system, and more particularly, to a method for radio resource management, a macro eNB and a low power node.

BACKGROUND OF THE RELATED ART

With continuous evolution of wireless communication technologies and standards, the mobile packet service has been developed tremendously, and the data throughput capability of a single terminal is constantly increasing. Take the long-term evolution (LTE) system for example, at 20 Megabits per second (Mbps, also called M), a maximum of 100 Mbps downlink data transmission rate can be supported within the bandwidth, while in the LTE-A (LTE-Advanced) network, the data transmission rate will increase and can reach even up to 1 Gigabits per second (Gbps).

Figure 1:
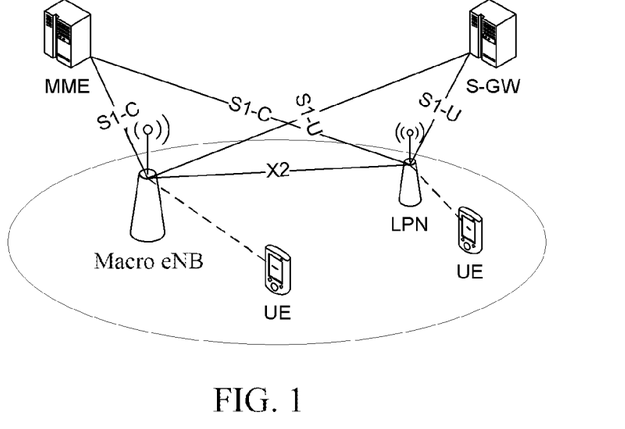
FIG. 1 is a schematic diagram of an existing LTE system network architecture.

Existing LTE systems mainly comprise a core network (CN), an access network (ANs) and user equipments (UEs), and its network architecture is shown in FIG. 1. Wherein, the CN mainly comprises a Mobility Management Entity (MME) responsible for control plane (CP) information and a Serving Gateway (S-GW) for user plane (UP) data transmission. The AN in a Heterogeneous Network (HetnNet) mainly comprises a Macro evolved Node B (Macro eNB) and various types of Low power nodes (LPNs), the nodes are connected via the X2 interface, and each node separately manages its own radio resource to ensure the resource is fully and effectively used. The interface between the eNB and the MME is called S1-C interface and the interface between the eNB and the S-GW is called S1-U interface, the S1 interfaces ensure the interaction and transmission of information and data between the AN and the CN. In the aspect of radio interfaces between the AN and the UE, an existing radio connection is a one-to-one dedicated link, and the link carries Signaling Radio Bearer (SRB) and data radio bearer (DRB) exchanged between the UE and the network.

The appearance of LPN is to meet growing demand for data services and geographical inequality of the services, in the process of operators deploying next-generation communication networks (that is, the LTE network), LPNs (also known as small cells (SCs)) are continuously increased to meet the hotspots' demand for data services. However, with the increase of the SCs, the network deployment environment is becoming more complex, which brings more problems. This is because the SC coverage range is much smaller as compared to the macro cell (MC), and the number of SCs is relatively large, therefore when the UE moves within the network, the signal quality of the radio link may change rapidly, resulting in frequent inter-cell handovers, and even leading to frequent data service interruptions or call drops or other problems, which also makes the user's data throughput and call experience degrade. With the increasing number of SCs deployed by operators and individuals in the future, the abovementioned situation will become increasingly serious.

SUMMARY OF THE INVENTION

The embodiment of the present invention provides a method for radio resource management, a macro eNB and a low power node, to guarantee the data service continuity and reduce the call drop rate.

The embodiment of the present invention provides a method for radio resource management, applied to a long-term evolution (LTE) system introduced with a low power node, comprising:

a macro eNB selecting a low power node for an accessed user equipment to provide a joint transmission service; and the low power node and the macro eNB jointly providing a radio resource management service for the user equipment.

Alternatively, the macro eNB selecting a low power node for an accessed user equipment to provide a joint transmission service comprises: the macro eNB generating a distributing strategy when selecting a low power node for the user equipment, and according to the distributing strategy, requesting the low power node to admit distribution bearer resources of the user equipment; and the low power node and the macro eNB jointly providing a radio resource management service for the user equipment comprises: the low power node performing a Radio Admission Control (RAC) on the distribution bearer resources, after determining to admit the distribution bearer resources, performing a dynamic resource allocation (DRA) on the distributed data when transmitting the distributed data with the user equipment.

Alternatively, the method further comprises:

the low power node performing a Radio Bearer Control (RBC) on the accessed user equipment after determining to admit the distribution bearer resources of the user equipment; and, after receiving the downlink distributed data, the low power node transmitting the downlink distributed data to the user equipment through a radio bearer between the low power node and the user equipment; after receiving uplink distributed data, sending the uplink distributed data to the macro eNB or a serving gateway.

Alternatively, the method further comprises:

when the low power node or the micro base station provide the joint transmission service for the user equipment, the low power node performing a connection mobility control (CMC) on radio bearers between the low power node and the user equipment or on all radio bearers of the user equipment, or the macro eNB performing the CMC on radio bearers between the macro eNB and the user equipment or on all radio bearers of the user equipment.

Alternatively, the method further comprises:

after the low power node determines to admit the distribution bearer resources of the user equipment, the macro eNB instructing the user equipment to access the low power nodes on the basis of keeping the connection with the macro eNB; and the user equipment accessing the macro eNB and the low power node simultaneously.

Alternatively, the distributing strategy comprises a distribution granularity, distribution level and flow control;

the distribution granularity comprises a data bearer, a service data flow or a data packet, which are used to indicate that the macro eNB takes the data bearer, the service data flow or the data packet as the granularity to distribute the data to the low power node;

the distribution level indicates a package form of data packets transmitted to the low power node; and the flow control indicates the number of data bearers, service data flows or data packets distributed from the macro eNB to the low power node.

The embodiment of the present invention further provides a macro eNB, comprising: a selection unit and a first resource management unit, wherein:

the selection unit is configured to: select a low power node for an accessed user equipment to provide a joint transmission service; and the first resource management unit is configured to: together with the low power node selected by the selection unit, provide a radio resource management service for the user equipment.

Alternatively, the first resource management unit is configured to together with the low power node selected by the selection unit, provide a radio resource management service for the user equipment in the following way:

generating a distributing strategy for the user equipment, and according to the distributing strategy, requesting the low power node to admit the distribution bearer resources of the user equipment.

Alternatively, the first resource management unit is further configured to: when providing a joint transmission service for the user equipment, perform a connection mobility control (CMC) on radio bearers between the macro eNB and the user equipment or on all radio bearers of the user equipment.

Alternatively, the first resource management unit is further configured to: after the low power node determines to admit the distribution bearer resources of the user equipment, instruct the user equipment to access the low power node on the basis of keeping the connection with the macro eNB.

Alternatively, the distributing strategy comprises a distribution granularity, distribution level and flow control;

the distribution granularity comprises a data bearer, a service data flow or a data packet, which are used to indicate that the macro eNB takes the data bearer, the service data flow or the data packet as the granularity to distribute the data to the low power node;

the distribution level indicates a package form of the data packets transmitted to the low power node; and the flow control indicates the number of data bearers, service data flows or data packets distributed from the macro eNB to the low power node.

The embodiment of the present invention further provides a low power node, comprising: a second resource management unit, wherein:

the second resource management unit is configured to: when the low power node is selected by a macro eNB to provide a joint transmission service for an accessed user equipment, provide a radio resource management service for the user equipment together with the macro eNB.

Alternatively, the second resource management unit is configured to provide the radio resource management service for the user equipment together with the macro eNB in the following way:

when the macro eNB requests the low power node to admit the distribution bearer resources of the user equipment, performing a Radio Admission Control (RAC) on the distribution bearer resources, after determining to admit the distribution bearer resources, performing a dynamic resource allocation (DRA) on the distributed data when transmitting the distributed data with the user equipment.

Alternatively, the low power node further comprises a data transmission unit, wherein:

the second resource management unit is further configured to: perform a Radio Bearer Control (RBC) on the accessed user equipment after determining to admit the distribution bearer resources of the user equipment; and, the data transmission unit is configured to: after receiving downlink distributed data, transmit the downlink distributed data to the user equipment through radio bearers between the low power node and the user equipment; after receiving uplink distributed data, transmit the uplink distributed data to the macro eNB or a serving gateway.

Alternatively, the second resource management unit is further configured to: when providing a joint transmission service for the user equipment, perform a connection mobility control (CMC) on radio bearers between the low power node and the user equipment or on all radio bearers of the user equipment.

The embodiment of the present invention further provides a long-term evolution system introduced with a low power node, comprising: a macro eNB and a low power node, wherein:

the macro eNB is configured to select a low power node for an accessed user equipment to provide a joint transmission service; and the low power node is configured to: together with the macro eNB, provide a radio resource management service for the user equipment.

Alternatively, the macro eNB is configured to select a low power node for an accessed user equipment to provide a joint transmission service in the following way: generating a distributing strategy when selecting a low power node for the user equipment, and according to the distributing strategy, requesting the low power node to admit the distribution bearer resources of the user equipment; and the low power node is configured to, together with the macro eNB, provide a radio resource management service for the user equipment in the following way: performing a Radio Admission Control (RAC) on the distribution bearer resources, after determining to admit the distribution bearer resources, performing a dynamic resource allocation (DRA) on the distributed data when transmitting the distributed data with the user equipment.

Alternatively, the low power node is further configured to: perform a Radio Bearer Control (RBC) on the accessed user equipment after determining to admit the distribution bearer resources of the user equipment; and, after receiving the downlink distributed data, transmit downlink distributed data to the user equipment through radio bearers between the low power node and the user equipment; after receiving uplink distributed data, transmit the uplink distributed data to the macro eNB or the serving gateway.

Alternatively, the low power node is further configured to: when providing the joint transmission service for the user equipment, perform a connection mobility control (CMC) on radio bearers between the low power node and the user equipment or on all radio bearers of the user equipment, or the macro eNB is further configured to: when providing the joint transmission service for the user equipment, perform the CMC on radio bearers between the macro eNB and the user equipment or on all radio bearers of the user equipment.

Alternatively, the macro eNB is further configured to: after the low power node determines to admit the distribution bearer resources of the user, instruct the user equipment to access the low power node on the basis of keeping the connection with the macro eNB; and the user equipment is configured to: access the macro eNB and the low power node simultaneously.

Alternatively, the distributing strategy comprises a distribution granularity, distribution level and flow control;

the distribution granularity comprises a data bearer, a service data flow or a data packet, which are used to indicate that the macro eNB takes the data bearer, the service data flow or the data packet as the granularity to distribute the data to the low power node;

the distribution level indicates a package form of the data packets transmitted to the low power node; and the flow control indicates the number of data bearers, service data flows or data packets distributed from the macro eNB to the low power node.

In summary, the distributed radio resource management system provided in the embodiment of the present invention can be used to make a macro eNB coordinate with a low power node, and jointly manage radio resources of a UE, thus making connections between network side devices and terminals no longer limited to the transmission performance of one link and be suitable for flexible scheduling and transmission way of data distribution between a variety of network side devices and the terminals. When the UE moves quickly and switches frequently between the SCs, the UE can timely obtain the stable control signaling, and the distributing way of user data can be flexibly adjusted between the base stations, and a mobility-related decision can be made quickly, which can ensure the data service continuity and enhance the performance of user data service and the user experience.

PREFERRED EMBODIMENTS OF THE INVENTION

In the existing network architecture, the function of radio resource management (RRM) is located in the base station, which can ensure that available radio resources are reasonably and effectively used, and provide a corresponding mechanism to meet the demand of the LTE system for radio resources. Currently, the UE only accesses one base station (macro eNB or LPN), which means that the radio resources required by the UE are unifiedly managed by the accessed base station. However, as mentioned above, the existing network architecture and operational mechanism cannot meet the increasingly complex deployment environment and expanding business needs, therefore, the development of the LTE-A system is bound to need a new architecture model and a more comprehensive and efficient radio resource management mechanism, so that the UE can obtain more available radio resources and more stable link transmission performance.

Figure 2:
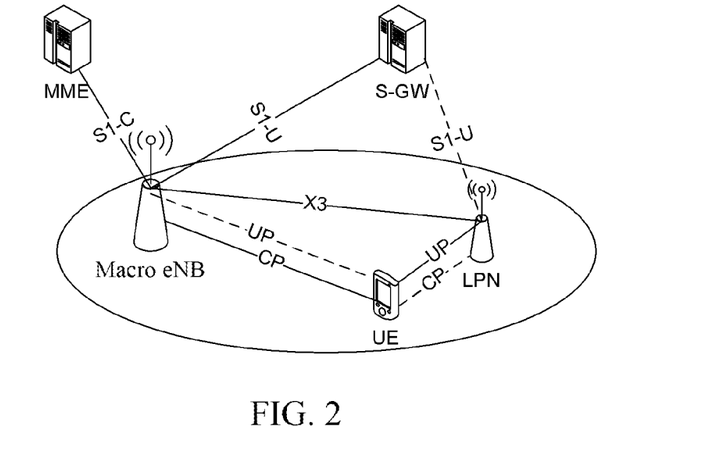
FIG. 2 is a schematic diagram of a system network architecture in accordance with an embodiment of the present invention.

The network architecture of the present embodiment is shown in FIG. 2, the macro eNB and the UE accessing the macro cell have established a CP connection, and the macro eNB determines the distributing strategy according to the UE's service data needs, the current wireless environment, resource load of the network and other information, and the distributing strategy comprises the distribution granularity, distribution level and flow control. Based on the distributing strategy, if the macro eNB still supports exchanging user data with the UE, the macro eNB establishes an UP connection with the UE.

Distribution granularity: it can be the data bearer, the service data flow or the Layer 2 (L2) data packet, and the macro eNB decides to distribute the data to the LPN by taking the data bearer, the service data flow or the L2 data packet as the granularity.

Distribution level: it indicates which protocol layer the distribution is started from, namely, the macro eNB distributes the downlink data packets to the LPN after processing to which protocol layer, that is, transmits data packets in which package form to the LPN, such as a packet data Convergence Protocol (PDCP) protocol data unit (PDU) or a radio link control (RLC) PDU.

Flow control: it indicates the number of data bearers, service data flows, or L2 data packets which the macro eNB decides to distribute to the LPN.

Figure 3A:
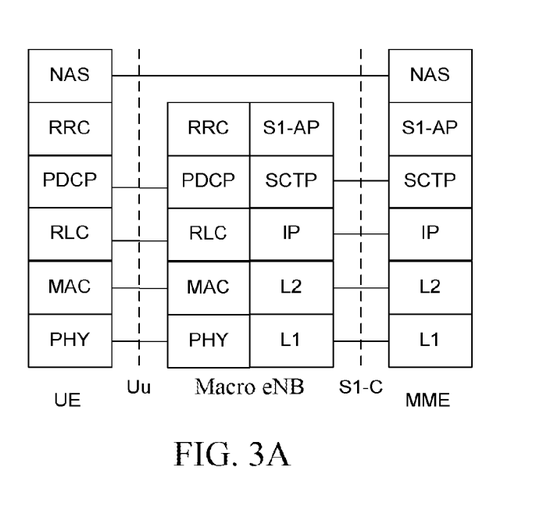
FIGS. 3A~3B are schematic diagrams of protocol stacks of interfaces between a CN, a macro eNB and a UE.
Figure 3B:
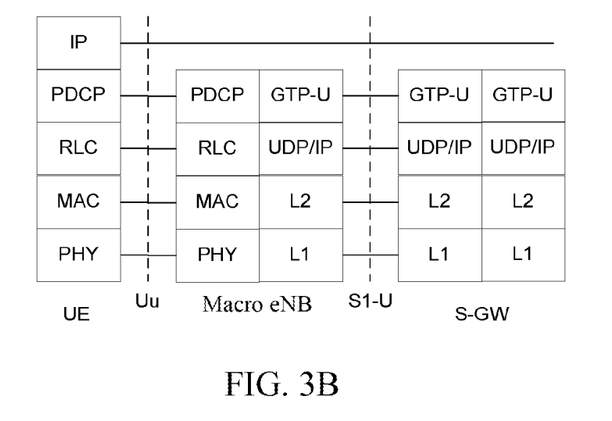

The protocol stack of the CP connection between the CN, the macro eNB and the UE is shown in FIG. 3A, the protocol stack of the UP connection is shown in FIG. 3B.

Based on the network deployment and distributing strategy, the LPN can transmit the UE's user data to the macro eNB, and it can also transmit the user data come from the macro eNB to the UE; and, the LPN can also transmit the UE's user data to the S-GW and transmit the user data coming from the S-GW to the UE. As shown in FIG. 2, in the architecture of the present embodiment, the interface between the LPN and the macro eNB can also be called "X3 Interface", the UE's distributed data carried thereon are transmitted between the macro eNB and the LPN.

Figure 4A:
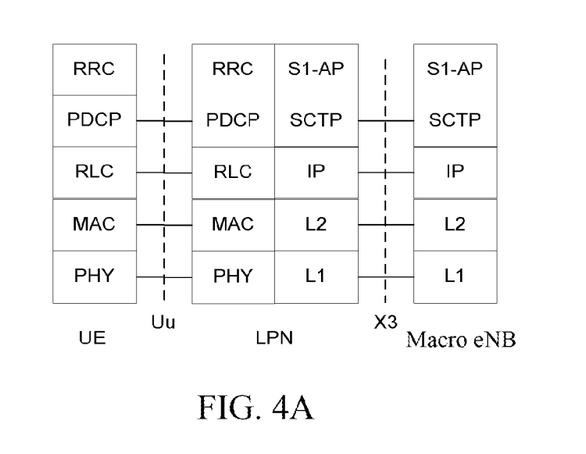
FIGS. 4A~4B are schematic diagrams of protocol stacks of interfaces between a macro eNB, a LPN and a UE.
Figure 4B:
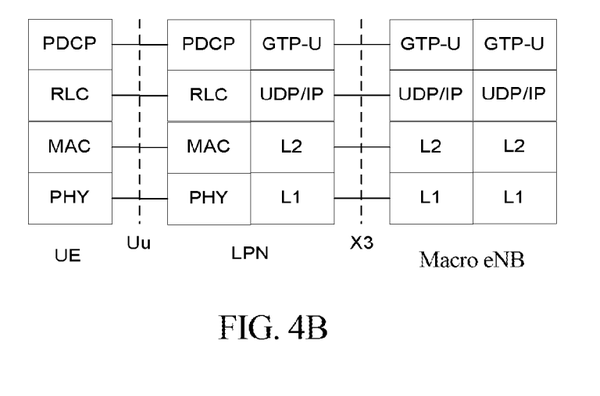

Alternatively, according to the distributing strategy, a CP connection can be established between the LPN and the UE, then the LPN may point-to-point exchange the control plane signaling with the UE, and notify the UE of the DRB addition/modification/deletion, and may obtain a measurement report and instruct the handover of cell and so on. FIG. 4A and FIG. 4B are schematic diagrams of a protocol stack model of a viable distributing architecture, and the protocol stack of the CP connection between the LPN, the macro eNB and the UE is shown in FIG. 4A, and the protocol stack of the UP connection is shown in FIG. 4B. A CP connection is established between the LPN and the UE, and the distribution takes the data bearer as the granularity, and at the X3 interface, the General Packet Radio Service (GPRS) Tunneling Protocol for User Plane (GTP-U) tunnel is used to transmit user data.

The X3 interface between the macro eNB and the LPN has various forms, such as wired cable, radio air interface and so on. In order to provide efficient and stable communication service for a UE simultaneously accessing two base stations, the implementation of RRM must be distributed in both the macro eNB and the LPN to manage the data transmission between themselves and the UE respectively to ensure the communication performance when the UE moves.

For user data distributed and transmitted in the LPN, the RRM functions that the LPN should have comprise:

RAC: approve or reject a new bearer establishment request.

DRA: allocate resources (including buffer, process resources and radio resource blocks) to the UE, select the data packet currently being scheduled, as well as manage the power of the resource blocks and so on. Configuring the DRA in the LPN can meet the dynamic and rapid requirements of the Media Access Control (MAC) layer and the physical layer in the LTE system on transmission.

Alternatively, the RRM functions that the LPN has may further comprise the following contents:

RBC: establish, manage, or release a radio bearer (RB).

CMC: manage the radio resources when the UE in the connected state moves, for example, make a handover decision based on the measurement and load in adjacent cells.

If there is a CP connection between the LPN and the UE, the RRC (Radio Resource Control) function corresponds to the RRM actually configured for the LPN.

In order to make the LPN effectively and reasonably achieve the abovementioned RRM functions, the macro eNB needs to provide and coordinate necessary information for the LPN, and the information is exchanged via the X3 interface, and the information comprises: one or more of the quality of service (QoS) requirement of a new RB, modification parameters of a RB in the session state, the RB release, and the UE security context.

The result of RRM is notified to the UE via a radio interface according to the CP connection architecture between the UE and the access network.

Hereinafter with reference to the accompanying drawings and in conjunction with the embodiments, implementations of patent document will be described in detail. It should be noted that, in the case of no conflict, embodiments and features in the embodiments of the present application may be combined with each other.

The First Embodiment

Figure 5:
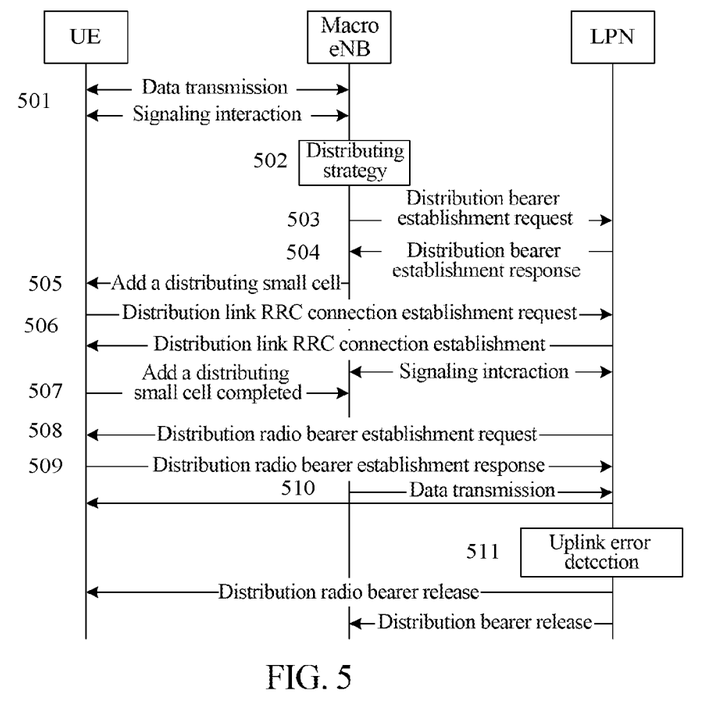
FIG. 5 is a flow chart of a first embodiment of the present invention.

The macro eNB selects an appropriate LPN to provide a joint transmission service, and after determining the distributing strategy, it requests the LPN to agree on bearing the transmission of distributed data. A RRC connection (a CP connection) can be established between a LPN and a UE, after the UE accesses the LPN, the distribution bearer addition/modification/deletion may be notified by the LPN to the UE through the RRC signaling; in terms of data, the LPN obtains the downlink distributed data, transmitted to the UE, from the macro eNB. As shown in FIG. 5, it comprises the following steps:

in step 501, a UE accesses a macro cell, and performs the transmission of user data and control signaling with the macro eNB through the Uu radio interface.

In step 502, the macro eNB selects a LPN for the accessed UE to provide a joint transmission service and determines the distributing strategy according to situations such as the UE's service data needs, the reported radio signal quality measurement result and the resource load of the network and so on, wherein the distributing strategy comprises the distribution granularity, distribution level and flow control.

In step 503, the macro eNB requests the LPN for admitting the resources required by the distribution.

If the macro eNB sends a control plane message via the X3 interface, the control plane message in the present embodiment is called "distribution bearer establishment request" message. The macro eNB sends the "distribution bearer establishment request" message and requests the low power node to admit the distribution bearer resources of the user equipment.

In the distributing scheme determined according to the distributing strategy, the message should comprise at least a distributing cell Identifier (ID), UE security context, QoS parameter, and other information. The purpose of the "distribution bearer establishment request" message is to make the LPN know resources needed for bearing the distribution, and the required resources are determined according to the QoS parameters of various bearers, namely, after the macro eNB decides to distribute which user data to the LPN through the distributing strategy, the QoS parameter of the data bearer to which these user data belong is notified to the LPN; the distribution level decides what protocol layers the LPN needs to be configured with, and configurations of the protocol layers are associated with the QoS parameter. Information such as the distributing cell ID and the UE security context is information required by the LPN necessarily for transmitting data.

In step 504, after receiving the message, the LPN decides whether to admit the new bearer (such as the RAC function) according to its own resources condition, and replies an acknowledgement message, such as "distribution bearer establishment response" after determining to admit the distribution bearer resources.

In step 505, after receiving the acknowledgement message from the LPN, the macro eNB instructs the UE to access the LPN selected for the UE on the basis of keeping the connection with the macro eNB through the CP connection between itself and the UE.

If the macro eNB sends a control plane message "adding a distributing small cell" to the UE, the message at least carries the necessary information assisting the UE to access the SC, such as the SC's physical channel configuration.

In step 506, the UE, in accordance with the instruction of the macro eNB, accesses the SC and establishes a SRB, which can transmit the control signaling, with the SC at the same time when keeping the CP connection and the UP connection with the macro eNB.

This process may be carried out by the UE exchanging the "distribution link RRC connection establishment request" message and the "distribution link RRC connection establishment" message with the LPN via the radio interface.

In step 507, the UE notifies the macro eNB that it has successfully accessed the SC, such as sending an "adding a distributing small cell completed" message.

In step 508, the LPN configures parameters of the air interface protocol layer for the RB according to the received QoS parameter of the to-be-established RB, and carries the configured parameters in the "distributing radio bearer establishment request" message and notify them to the UE (that is, the RBC function) via the CP connection between itself and the UE.

The air interface protocol layer is the PDCP, RLC, MAC, PHY and so on.

In step 509, after establishing it successfully, the UE replies a "distributing radio bearer establishment response" message to the LPN.

After the DRB is established successfully, the distributed user data can be transmitted.

In step 510, the macro eNB obtains the UE's user data from the core network (that is, S-GW), and according to the distributing strategy, transmits the downlink distributed data which need to be distributed to the LPN via the X3 interface between the LPN and macro eNB, and the LPN processes the received downlink distributed data via its L2/L1, bears the data in the DRB and transmits the data to the UE (that is, the DRA function).

The step 510 takes the downlink as an example.

After receiving the uplink distributed data, the uplink distributed data are sent to the macro eNB or the S-GW.

In step 511, the LPN detects that the performance of the uplink between itself and the UE degrades (that is, there is error in the uplink), the LPN releases the distribution link to avoid interference and system performance degradation.

Alternatively, the LPN notifies the distribution bearer release to the macro eNB (it may also be notified by the UE), so that the macro eNB makes timely adjustments to transmission links of distributed data, and if no user data are distributed to the LPN for forwarding, the macro eNB itself can bear all the data between it and the UE.

The Second Embodiment

Figure 6:
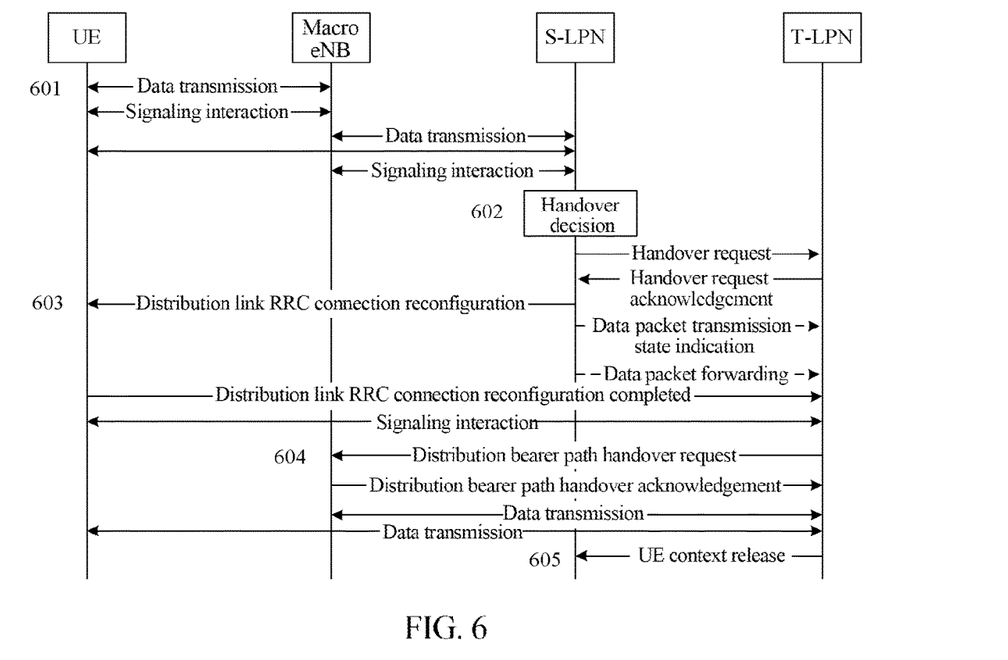
FIG. 6 is a flow chart of a second embodiment of the present invention.

When providing the joint transmission service for the UE, the LPN executes the CMC on radio bearers between the LPN and the UE or on all radio bearers of the UE. The UE that accesses the macro cell establishes a CP connection and a UP connection with the LPN simultaneously, and the LPN configures the UE measurement and makes a handover decision (that is, the CMC function) by itself according to the measurement result. After indicating the UE that the handover completes, the source LPN (S-LPN) notifies the macro eNB of the change of the distributed data transmission path. As shown in FIG. 6, it comprises the following steps:

in step 601, the UE in the connected state and the macro eNB establish an UP connection for user data transmission and a CP connection for control signaling transmission at the radio interface, and, according to the distributing strategy determined by the macro eNB, the UE simultaneously establishes a UP connection and a CP connection with the LPN which bears the distributed data transmission.

in step 602, the LPN configures the UE to perform the measurement and receives the measurement result, and according to the measurement result, the S-LPN selects a more appropriate target LPN (T-LPN) for the UE as a new node bearing the distribution transmission, and the S-LPN sends a "Handover Request" message to the T-LPN, and the message carries the target cell ID, UE security-related parameters, configuration of the distribution bearer in the S-LPN and other information; after receiving the message, the T-LPN decides whether to admit it or not according to its own resource condition, if it agrees to admit, then it replies "Handover Request Acknowledgement" message, and carries its own L2/L1 configuration for the distribution bearer in the message.

It should be noted that, in order to avoid the repeating measurement of the same measurement object and meeting the UE's power saving requirements, under the architecture in which both the macro eNB and the LPN can configure the UE to perform the measurement, the measurement configuration sent by two nodes should be negotiated in advance, for example, in the case that the macro eNB and the LPN have different frequencies, the macro eNB can configure the UE to only measure the frequency band of the macro eNB, and the LPN can configure the UE to only measure the frequency band of the LPN; and the UE report can also be flexibly configured, for example, the UE reports the measurement result instructed by the LPN to the LPN, and reports the comprehensive measurement result instructed by the LPN and the macro eNB unifiedly to the macro eNB.

In step 603, the S-LPN sends a control plane message "distribution link RRC Connection Reconfiguration" to the UE via the radio interface between itself and the UE, to indicate the handover command to the UE, and the message carries necessary information for accessing the T-LPN and the L2/L1 configuration parameter of the T-LPN on the distribution bearer.

In addition, according to the determined distributing scheme, the S-LPN can indicate to the T-LPN the serial number of the distributed data packet successfully transmitted between itself and the UE, and forward the data packet received from the macro eNB, but not yet successfully received by the UE to the T-LPN. The UE accesses the T-LPN and establishes, together with the T-LPN, a SRB which can transmit the control plane signaling according to the S-LPN's control plane messages.

Step 604, the T-LPN notifies the macro eNB of the change of distributing cell, for example, it sends a "distribution bearer path handover request" message to the macro eNB through the X3 interface, and the message carries the new destination address (that is, T-LPN) of the distribution bearer; after switching the bearer path according to the received message, the macro eNB replies a "distribution bearer path handover acknowledgement" message to the T-LPN, and then transmits the distributed data packet to the T-LPN, and then the T-LPN sends it to the UE.

In step 605, the T-LPN also sends a control plane message to the S-LPN to instruct the S-LPN to release the UE context.

The Third Embodiment

Figure 7:
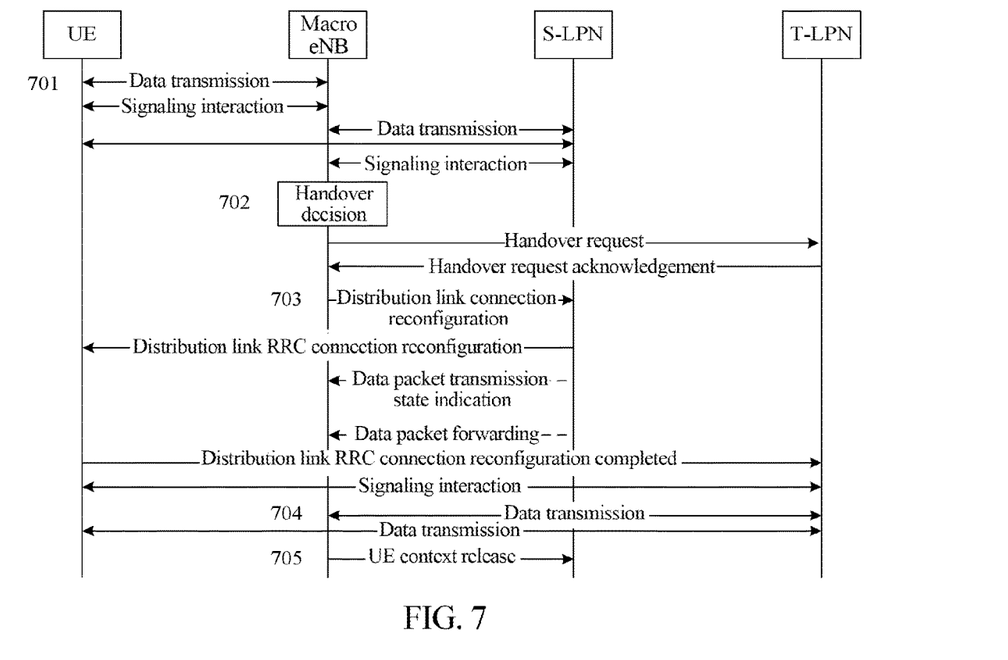
FIG. 7 is a flow chart of a third embodiment of the present invention.

When the macro eNB provides a joint transmission service for the UE, it performs the CMC on radio bearers between the macro eNB and the UE or all radio bearers of the user equipment. The UE which has accessed the macro cell also established the CP connection and the UP connection with the LPN simultaneously, and the macro eNB configures the UE to perform the measurement, and decides to hand over the UE to the new LPN to continue transmitting the distributed data according to the measurement result. As shown in FIG. 7, it comprises the following steps:

in step 701, the UE in the connected state establishes a UP connection for user data transmission and a CP connection for control signaling transmission with the macro eNB at the radio interface, and according to the distributing strategy determined by the macro eNB, the UE establishes a UP connection and a CP connection simultaneously with the LPN which bears the distributed data transmission.

In step 702, the macro eNB configures the UE to perform a measurement and receive the measurement result, and according to the measurement result, the micro base station selects a T-LPN whose radio signal quality is more suitable for the UE as a new node bearing the distribution transmission, and the macro eNB sends a "Handover Request" message to the T-LPN, and the message carries the target cell ID, the UE security-related parameters, configuration of the distribution bearer in the S-LPN and other information (previously the macro eNB obtains the configuration information from the S-LPN); after receiving the message, the T-LPN decides whether to admit or not according to its own resources condition, if it agrees to admit, it replies a "Handover Request Acknowledgement" message and carries its own L2/L1 configuration for the distribution bearer in the message.

In step 703, the macro eNB notifies the "distribution link connection reconfiguration" message of the distribution link handover to the S-LPN, and the message carries the target SC access information and the T-LPN's L2/L1 configuration parameters for the distribution bearer; the S-LPN carries this information in the control plane message "distribution link RRC Connection Reconfiguration" and sends it to the UE through the radio interface between itself and the UE, and indicates the handover command to the UE.

In addition, according to the determined distributing scheme and configuration, the S-LPN can indicate to the macro eNB the serial numbers of distributed data packets successfully transmitted between itself and the UE, and send the data packets which are received from the macro eNB but have not been successfully received by the UE back to the macro eNB; the macro eNB may forward the serial numbers and the data packets to the T-LPN. The UE accesses the T-LPN according to the control plane message of the macro eNB, and establishes a SRB which can transmit the control plane signaling with the T-LPN.

In step 704, after the macro eNB has known the new destination address of the distribution bearer, it sends the data packets to the T-LPN, then the T-LPN sends the data packets to the UE.

In step 705, the macro eNB also transmits a control plane message to the S-LPN, to instruct it to release the UE context.

The present embodiment provides a system for multiple base stations distributively managing radio resources, to provide joint and optimized communication services for the UE.

Figure 8:
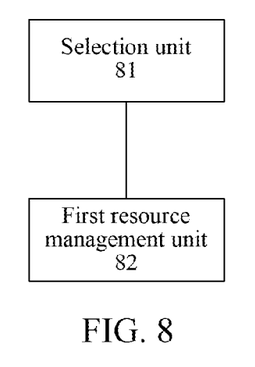
FIG. 8 is an architecture diagram of a macro eNB in accordance with an embodiment of the present invention.

As shown in FIG. 8, the present embodiment further provides a macro eNB, comprising: a selection unit 81 and a first resource management unit 82, wherein:

the selection unit 81 is used to: select a low power node for an accessed UE to provide a joint transmission service; and the first resource management unit 82 is used to: together with the LPN selected by the selection unit 81, provide a RRM service for the UE.

The first resource management unit 82 is used to together with the LPN selected by the selection unit 81, provide the RRM service for the UE in the following way:

generating a distributing strategy for the user equipment, and according to the distributing strategy, requesting the LPN to admit the distribution bearer resources of the user equipment.

The first resource management unit 82 is further used to: when providing a joint transmission service for the user equipment, perform a connection mobility control (CMC) on radio bearers between the macro eNB and the user equipment or on all radio bearers of the user equipment.

The first resource management unit 82 is further used to: after the LPN determines to admit the distribution bearer resources of the user equipment, instruct the UE to access the LPN on the basis of keeping the connection with the macro eNB.

The distributing strategy comprises a distribution granularity, distribution level and flow control;

the distribution granularity comprises the data bearer, the service data flow or the data packet, which are used to indicate that the macro eNB takes the data bearer, the service data flow or the data packet as the granularity to distribute the data to the LPN;

the distribution level indicates the package form of data packets transmitted to the LPN; and the flow control indicates the number of data bearers, service data flows or data packets distributed from the macro eNB to the LPN.

Figure 9:
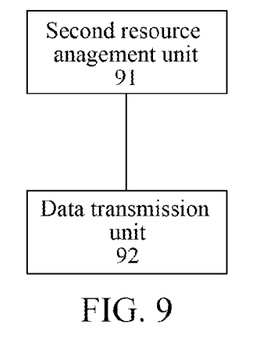
FIG. 9 is an architecture diagram of a low power node in accordance with an embodiment of the present invention.

As shown in FIG. 9, the present embodiment further provides a LPN, comprising: a second resource management unit 91, wherein:

the second resource management unit 91 is used to: when the LPN is selected by a macro eNB to provide a joint transmission service for an accessed UE, provide a RRM service for the UE together with the macro eNB.

The second resource management unit 91 is used to provide the RRM service for the user equipment together with the macro eNB in the following way:

when the macro eNB requests the LPN to admit the distribution bearer resources of the user equipment, performing a Radio Admission Control (RAC) on the distribution bearer resources, and after determining to admit the distribution bearer resources, performing a dynamic resource allocation (DRA) on the distributed data when transmitting the distributed data with the user equipment.

The LPN further comprises a data transmission unit 92, wherein:

the second resource management unit 91 is further used to: perform a Radio Bearer Control (RBC) on the accessed user equipment after determining to admit the distribution bearer resources of the UE; and, the data transmission unit 92 is used to: after receiving downlink distributed data, transmit the downlink distributed data to the UE through a radio bearer between the LPN and the UE; after receiving uplink distributed data, transmit the uplink distributed data to the macro eNB or the serving gateway.

The second resource management unit 91 is further used to: when providing the joint transmission service for the UE, perform a connection mobility control (CMC) on radio bearers between the LPN and the UE or all radio bearers of the UE.

Please refer to FIG. 2 again, and the present embodiment further provides a long-term evolution system introduced with a low power node, comprising: a macro eNB and a low power node, wherein:

the macro eNB is used to select a LPN for an accessed user equipment to provide a joint transmission service; and the LPN is used to: together with the macro eNB, provide the RRM service for the UE.

The macro eNB is used to select a LPN for the accessed UE to provide a joint transmission service in the following way: generating a distributing strategy when selecting a LPN for the UE, and according to the distributing strategy, requesting the LPN to admit the distribution bearer resources of the user equipment; and the LPN is used to, together with the macro eNB, provide the RRM service for the UE in the following way: performing A Radio Admission Control (RAC) on the distribution bearer resources, after determining to admit the distribution bearer resources, performing a dynamic resource allocation (DRA) on the distributed data when transmitting the distributed data with the UE.

The LPN is further used to: perform a Radio Bearer Control (RBC) on the accessed UE after determining to admit the distribution bearer resources of the UE; and, after receiving downlink distributed data, transmit the downlink distributed data to the UE through a radio bearer between the LPN and the UE; after receiving the uplink distributed data, send the uplink distributed data to the macro eNB or the S-GW.

The LPN is further used to: when providing the joint transmission service for the UE, perform a connection mobility control (CMC) on radio bearers between the LPN and the UE or all radio bearers of the UE, or the macro eNB is further used to: when providing the joint transmission service for the UE, perform the CMC on radio bearers between the macro eNB and the UE or all radio bearers of the UE.

The macro eNB is further used to: after the LPN determines to admit the distribution bearer resources of the UE, instruct the UE to access the LPN on the basis of keeping the connection with the macro eNB;

the UE is used to: access the macro eNB and the LPN simultaneously.

The distributing strategy comprises the distribution granularity, the distribution level and the flow control;

the distribution granularity comprises the data bearer, the service data flow or the data packet, which are used to indicate that the macro eNB takes the data bearer, the service data flow or the data packet as the granularity to distribute the data to the LPN;

the distribution level indicates the package form of data packets transmitted to the LPN; and the flow control indicates the number of data bearers, service data flows or data packets distributed from the macro eNB to the LPN.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

Of course, the patent document may have a variety of other embodiments, and without departing from the spirit and essence of the patent document, those skilled in the art can make various corresponding changes and modifications in accordance with the embodiments of the present invention, and these corresponding changes and modifications should fall within the protection scope of the appended claims of the patent document.

INDUSTRIAL APPLICABILITY

The technical scheme in accordance with the embodiment of the present invention can be used to make a macro eNB coordinate with a low power node, and jointly manage radio resources of a UE, thus making connections between network side devices and terminals no longer limited to the transmission performance of one link and be suitable for flexible scheduling and transmission way of data distribution and between a variety of network side devices and terminals; and ensuring the data service continuity and enhancing the user data service performance and the user experience.

What is claimed is:

1. A method for radio resource management, applied to a long-term evolution (LTE) system introduced with a source low power node (S-LPN) and a target low power node (T-LPN), comprises:

a macro evolved node B selecting the S-LPN for an accessed user equipment to provide a joint transmission service;

the S-LPN and the macro evolved node B jointly providing a radio resource management service for the user equipment;

the S-LPN indicating to the T-LPN or the macro evolved node B the serial number of a distributed data packet successfully transmitted between the S-LPN and the user equipment; and the S-LPN forwarding to the T-LPN data packet received from the macro evolved node B, but not yet successfully received by the user equipment; wherein the user equipment accesses the T-LPN and establishes, together with the T-LPN, a signaling radio bearer.

2. The method of claim 1, wherein, the macro evolved node B selecting the S-LPN comprises:

the macro evolved node B generating a distributing strategy when selecting the S-LPN for the user equipment, and according to the distributing strategy, requesting the S-LPN to admit distribution bearer resources of the user equipment; and the S-LPN and the macro evolved node B jointly providing a radio resource management service for the user equipment comprises:

the S-LPN performing a Radio Admission Control (RAC) on the distribution bearer resources, after determining to admit the distribution bearer resources, performing a dynamic resource allocation (DRA) on distributed data when transmitting the distributed data with the user equipment.

3. The method of claim 2, further comprising:

the S-LPN performing a Radio Bearer Control (RBC) on the accessed user equipment after determining to admit the distribution bearer resources of the user equipment; and, after receiving downlink distributed data, the S-LPN transmitting the downlink distributed data to the user equipment through radio bearers between the S-LPN and the user equipment; after receiving uplink distributed data, sending the uplink distributed data to the macro evolved node B or a serving gateway.

4. The method of claim 2, further comprising:

when the S-LPN or the macro evolved node B provide the joint transmission service for the user equipment, the S-LPN performing a connection mobility control (CMC) on radio bearers between the S-LPN and the user equipment or on all radio bearers of the user equipment, or the macro evolved node B performing the CMC on radio bearers between the macro evolved node B and the user equipment or on all radio bearers of the user equipment.

5. The method of claim 2, further comprising:

after the S-LPN determines to admit the distribution bearer resources of the user equipment, the macro evolved node B instructing the user equipment to access the S-LPN on the basis of keeping a connection with the macro evolved node B; and the user equipment accessing the macro evolved node B and the S-LPN simultaneously.

6. The method of claim 2, wherein:

the distributing strategy comprises a distribution granularity, a distribution level and a flow control;

the distribution granularity comprises a data bearer, a service data flow or a data packet, which are used to indicate that the macro evolved node B takes the data bearer, the service data flow or the data packet as a granularity to distribute data to the S-LPN;

the distribution level indicates a package form of data packets transmitted to the S-LPN; and the flow control indicates the number of data bearers, service data flows or data packets distributed from the macro evolved node B to the S-LPN.

7. A macro evolved node B, comprising: a selection unit and a first resource management unit, wherein:
- the selection unit is configured to: select a source low power node (S-LPN) for an accessed user equipment to provide a joint transmission service; and
- the first resource management unit is configured to: together with the S-LPN selected by the selection unit, provide a radio resource management service for the user equipment; wherein
- the S-LPN indicates to the first resource management unit of the macro evolved node B the serial number of distributed data packet successfully transmitted between the S-LPN and the user equipment;
- the S-LPN forwards to a target low power node (T-LPN) data packet received from the first resource management unit of the macro evolved node B, but not yet successfully received by the user equipment; and
- the user equipment accesses the T-LPN data according to control plane message of the macro evolved node B.

8. The macro evolved node B of claim 7, wherein:
- the first resource management unit is configured to together with the S-LPN selected by the selection unit, provide a radio resource management service for the user equipment in a following way:
- generating a distributing strategy for the user equipment, and according to the distributing strategy, requesting the S-LPN to admit distribution bearer resources of the user equipment.

9. The macro evolved node B of claim 8, wherein:
- the first resource management unit is further configured to: when providing a joint transmission service for the user equipment, perform a connection mobility control (CMC) on radio bearers between the macro evolved node B and the user equipment or on all radio bearers of the user equipment;
- or
- the first resource management unit is further configured to: after the S-LPN determines to admit the distribution bearer resources of the user equipment, instruct the user equipment to access S-LPN on the basis of keeping a connection with the macro evolved node B.

10. The macro evolved node B of claim 8, wherein,
- the distributing strategy comprises a distribution granularity, a distribution level and a flow control;
- the distribution granularity comprises a data bearer, a service data flow or a data packet, which are used to indicate that the macro evolved node B takes the data bearer, the service data flow or the data packet as a granularity to distribute data to the S-LPN;
- the distribution level indicates a package form of data packets transmitted to the S-LPN; and
- the flow control indicates the number of data bearers, service data flows or data packets distributed from the macro evolved node B to the S-LPN.

11. A source low power node (S-LPN), comprising: a second resource management unit, wherein:
- the second resource management unit is configured to: when the S-LPN is selected by a macro evolved node B to provide a joint transmission service for an accessed user equipment, together with the macro evolved node B, provide a radio resource management service for the user equipment;
- the second resource management unit is further configured to: indicate to a target low power node (T-LPN) or the macro evolved node B the serial number of distributed data packet successfully transmitted between the S-LPN and the user equipment, and forward to the T-LPN data packet received from the macro evolved node B, but not yet successfully received by the user equipment;
- the user equipment accesses the T-LPN and establishes, together with the T-LPN, a signaling radio bearer which can transmit control plane signaling according to the S-LPN's control plane messages.

12. The S-LPN of claim 11, wherein:
- the second resource management unit is configured to together with the macro evolved node B, provide the radio resource management service for the user equipment in a following way:
- when the macro evolved node B requests the S-LPN to admit distribution bearer resources of the user equipment, performing a Radio Admission Control (RAC) on the distribution bearer resources, after determining to admit the distribution bearer resources, performing a dynamic resource allocation (DRA) on distributed data when transmitting the distributed data with the user equipment.

13. The S-LPN of claim 11, further comprising a data transmission unit, wherein:
- the second resource management unit is further configured to: perform a Radio Bearer Control (RBC) on the accessed user equipment after determining to admit distribution bearer resources of the user equipment; and,
- the data transmission unit is configured to: after receiving downlink distributed data, transmit the downlink distributed data to the user equipment through radio bearers between the S-LPN and the user equipment; after receiving uplink distributed data, transmit the uplink distributed data to the macro evolved node B or a serving gateway.

14. The S-LPN of claim 11, wherein,
- the second resource management unit is further configured to: when providing a joint transmission service for the user equipment, perform a connection mobility control (CMC) on radio bearers between the S-LPN and the user equipment or on all radio bearers of the user equipment.

15. A long-term evolution system introduced with a low power node, comprising: a macro evolved node B, a source low power node (S-LPN) and a target low power node (T-LPN), wherein:
- the macro evolved node B is configured to select the S-LPN for an accessed user equipment to provide a joint transmission service; and
- the S-LPN is configured to: together with the macro evolved node B, provide a radio resource management service for the user equipment; wherein
- the S-LPN is further configured to indicate to the T-LPN or the macro evolved node B the serial number of distributed data packet successfully transmitted between the S-LPN and the user equipment, and forward to the T-LPN data packet received from the macro evolved node B, but not yet successfully received by the user equipment; wherein
- the user equipment accesses the T-LPN and establishes, together with the T-LPN, a signaling radio bearer.

16. The system of claim 15, wherein,
- the macro evolved node B is configured to select a source low power node (S-LPN) for an accessed user equipment to provide a joint transmission service in a following way: generating a distributing strategy when selecting the S-LPN for the user equipment, and according to the distributing strategy, requesting the S-LPN to admit distribution bearer resources of the user equipment; and the S-LPN is configured to, together with the macro evolved node B, provide a radio resource management service for the user equipment in a following way: performing a Radio Admission Control (RAC) on the distribution bearer resources, after determining to admit the distribution bearer resources, performing a dynamic resource allocation (DRA) on distributed data when transmitting the distributed data with the user equipment.

17. The system of claim 16, wherein, the S-LPN is further configured to: perform a Radio Bearer Control (RBC) on the accessed user equipment after determining to admit the distribution bearer resources of the user equipment; and, after receiving downlink distributed data, transmit the downlink distributed data to the user equipment through radio bearers between the S-LPN and the user equipment; after receiving uplink distributed data, transmit the uplink distributed data to the macro evolved node B or a serving gateway.

18. The system of claim 16, wherein,
the S-LPN is further configured to: when providing the joint transmission service for the user equipment, perform a connection mobility control (CMC) on radio bearers between the S-LPN and the user equipment or on all radio bearers of the user equipment; or the macro evolved node B is further configured to: when providing the joint transmission service for the user equipment, perform the CMC on radio bearers between the macro evolved node B and the user equipment or on all radio bearers of the user equipment.

19. The system of claim 16, wherein,
the macro evolved node B is further configured to: after the S-LPN determines to admit the distribution bearer resources of the user equipment, instruct the user equipment to access the S-LPN on the basis of keeping a connection with the macro evolved node B; and the user equipment is configured to: access the macro evolved node B and the S-LPN simultaneously.

20. The system of claim 16, wherein,
the distributing strategy comprises a distribution granularity, a distribution level and a flow control;

the distribution granularity comprises a data bearer, a service data flow or a data packet, which are used to indicate that the macro evolved node B takes the data bearer, the service data flow or the data packet as a granularity to distribute data to the S-LPN;

the distribution level indicates a package form of data packets transmitted to the S-LPN; and the flow control indicates the number of data bearers, service data flows or data packets distributed from the macro evolved node B to the S-LPN.

* * * * *